United States Patent [19]

James

[11] 4,337,561
[45] Jul. 6, 1982

[54] PLATE SEPARATOR CONSTRUCTION METHOD

[76] Inventor: William James, 19 Mansion Pl., Greenwich, Conn. 06830

[21] Appl. No.: 289,152

[22] Filed: Aug. 3, 1981

[51] Int. Cl.³ .......................................... B23P 19/04
[52] U.S. Cl. .................................. 29/157 R; 29/446; 210/521; 210/237
[58] Field of Search .............. 210/802, 232, 237, 238, 210/521, 522, 540; 29/157 R, 446, 425

[56] References Cited

U.S. PATENT DOCUMENTS

| | | | |
|---|---|---|---|
| 3,727,770 | 4/1973 | Mochizuki | 210/522 |
| 3,731,802 | 5/1973 | James | 210/197 |
| 3,847,813 | 11/1974 | Castelli | 210/522 |
| 3,852,199 | 12/1974 | Wachsmuth | 210/522 |
| 3,957,656 | 5/1976 | Castelli | 210/521 |
| 4,194,976 | 3/1980 | Robinsky | 210/521 |
| 4,273,654 | 6/1981 | Pielkenrood | 210/232 |

FOREIGN PATENT DOCUMENTS 896899 5/1962 United Kingdom ................... 29/446

OTHER PUBLICATIONS

"Vacuum System for Shrink-Fitting Large Tubes Machinery", vol. 84, Mar. 5, 1954, 479.
Fuchs, Assembling Pre-Shrunk Multi-Ring Pressure Vessels, Technical Digest No. 13, Jan. 1969, p. 15.

*Primary Examiner*—Ernest G. Therkorn
*Attorney, Agent, or Firm*—McGlew and Tuttle

[57] ABSTRACT

A method of inserting a stack of interconnected corrugated plates, into a housing having spaced side walls is disclosed which utilizes the distortability of resilient material making up the corrugated plates to change at least one dimension of the stack and permit insertion of the stack in the housing. A combination of the first distorted and then released stack, with the housing is also disclosed. The method of inserting and stack with housing combination is useful in liquid separators for separating liquids at different densities.

4 Claims, 7 Drawing Figures

U.S. Patent  Jul. 6, 1982  Sheet 1 of 2  4,337,561
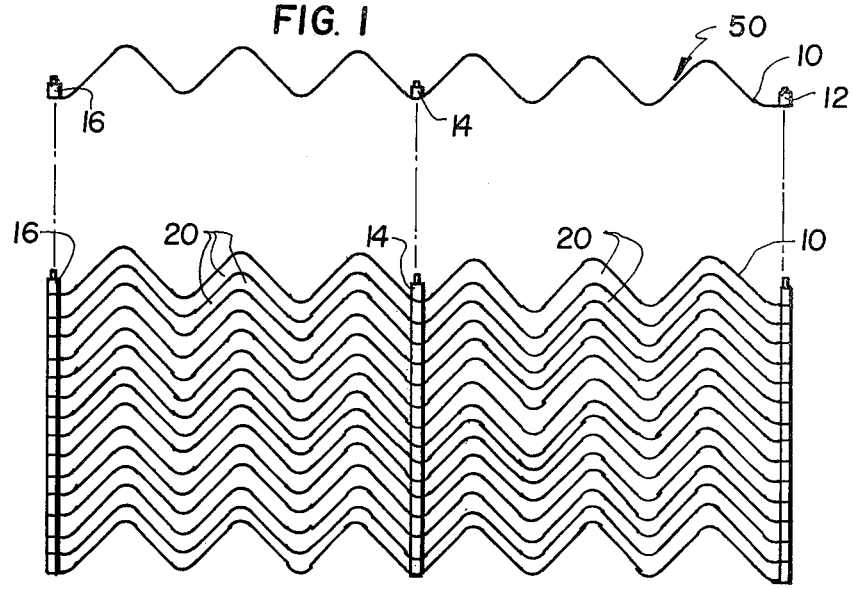
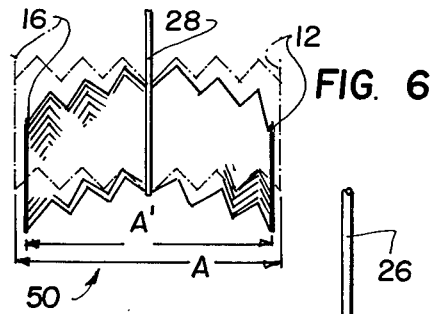
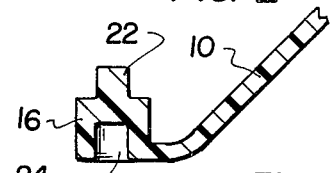
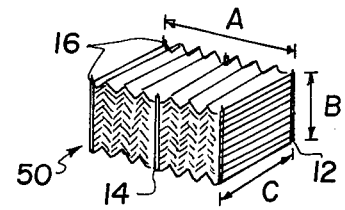
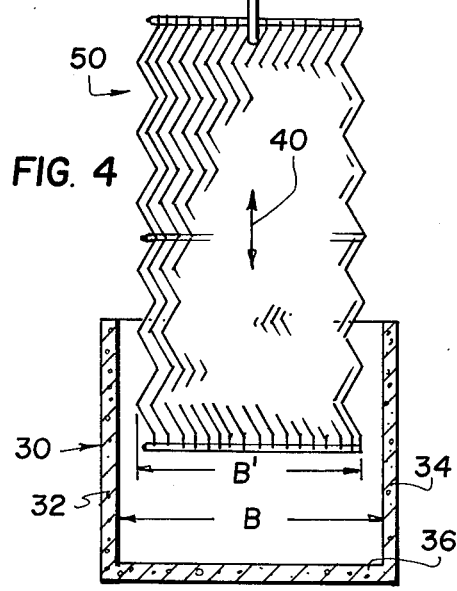
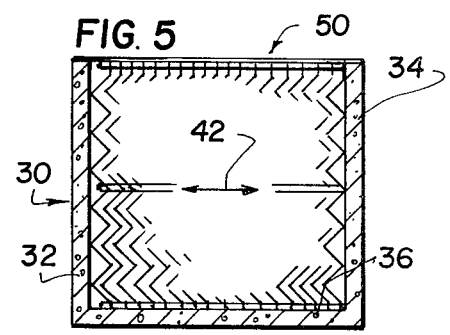

PLATE SEPARATOR CONSTRUCTION METHOD

REFERENCE TO OTHER PATENTS

The inventors previous U.S. Pat. No. 3,731,802 granted May 8, 1973 is pertinent in understanding this invention and incorporated herein by reference.

FIELD AND BACKGROUND OF THE INVENTION

The present invention relates in general to the field of liquid separators, and in particular to a new and useful method and construction of a separator housing including a stack of spaced plates, which contribute to the separation function.

It is known to use a stack of corrugated and spaced plates in the environment of liquid, in particular oil separators. See for example U.S. Pat. No. 3,847,813 dated Nov. 12, 1974 and U.S. Pat. No. 3,957,656 dated May 18, 1976, both to Castelli.

It is also known to construct separators without such plates as exemplified in the James patent identified above.

A problem arises however in retrofitting or assembling a stack of corrugated plates with an existing separator. The housing walls in which the separator is to be positioned must be of a dimension sufficiently small to permit insertion of the separator plates, plus any supporting framework, within the space. With such reduced dimension of the plates however a possibility arises that liquid, rather than the channel through the tortuous path defined between adjacent plates, will follow a path of least resistance around the stack.

The problem is particularly acute in separators which have walls defined therein which cannot be removed for inserting a suitably sized stack. Examples of this are cases wherein separator housings are formed by poured concrete.

SUMMARY OF THE INVENTION

The present invention relates to a method of inserting a stack of spaced plates into a housing having opposite side walls separated by a dimension which corresponds to at least one dimension of the stack.

Another object of the invention is to provide a housing plus stack combination wherein the stack has at least one dimension which corresponds closely to the separation between side walls of the housing.

Accordingly another object of the invention is to provide a method of inserting a stack of interconnected corrugated plates defining tortuous paths therebetween and made of resilient material, the stack having a stack length and a stack width, into a housing having side walls spaced from each other by substantially one of the stack length and stack width, comprising engaging the stack at a portion thereof so as to leave the remainder of the stack unengaged, suspending the stack from the portion so that the plates of the stack become distorted so as to change one of the stack width and stack length, inserting the stack with the distorted plates into the housing with the changed one of the stack width and stack length extending between the housing side walls, and releasing the stack after it is in the housing so that the distorted plates, by the action of their resilient material, return the stack to the one stack width and stack length.

Another object of the invention is to provide the separator and plate stack combination which comprises a housing having opposite side walls spaced from each other by a selected distance, a stack of a plurality of spaced corrugated and interconnected plates defining tortuous paths therebetween and made of resilient material, the stack having an undistorted stack length and stack width which is substantially similar to the selected distance between the housing side walls, the stack having one of a distorted stack length and stack width which is different from the undistorted stack length and stack width respectively so that the stack is insertable between the housing side walls, the undistorted stack being positioned between the housing side walls and closely associated with each of the side walls.

Another object of the invention is to provide such a combination which is simple in design, rugged in construction and economical to manufacture, and a method which permits the insertion of a plate stack into a housing space having a dimension substantially the same as at least one dimension of the stack.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

BRIEF DESCRIPTION OF THE DRAWINGS

In the Drawings

FIG. 1 is a side elevational view, partially exploded, of a plate stack according to the invention;

FIG. 2 is an enlarged partial side sectional view of interengagement means for engaging adjacent plates in the stack of FIG. 1;

FIG. 3 is a perspective view showing various dimensions of the finished stack;

FIG. 4 is a side elevational view partially in section, and exaggerated to illustrate the method of the invention;

FIG. 5 is a view similar to FIG. 4 showing a stack of corrugated plates inserted into a housing having a selected spacing between side walls thereof;

FIG. 6 is a side elevational view illustrating another embodiment of the invention.

DESCRIPTION OF THE PREFERRED EMBODIMENT

Figure 7:
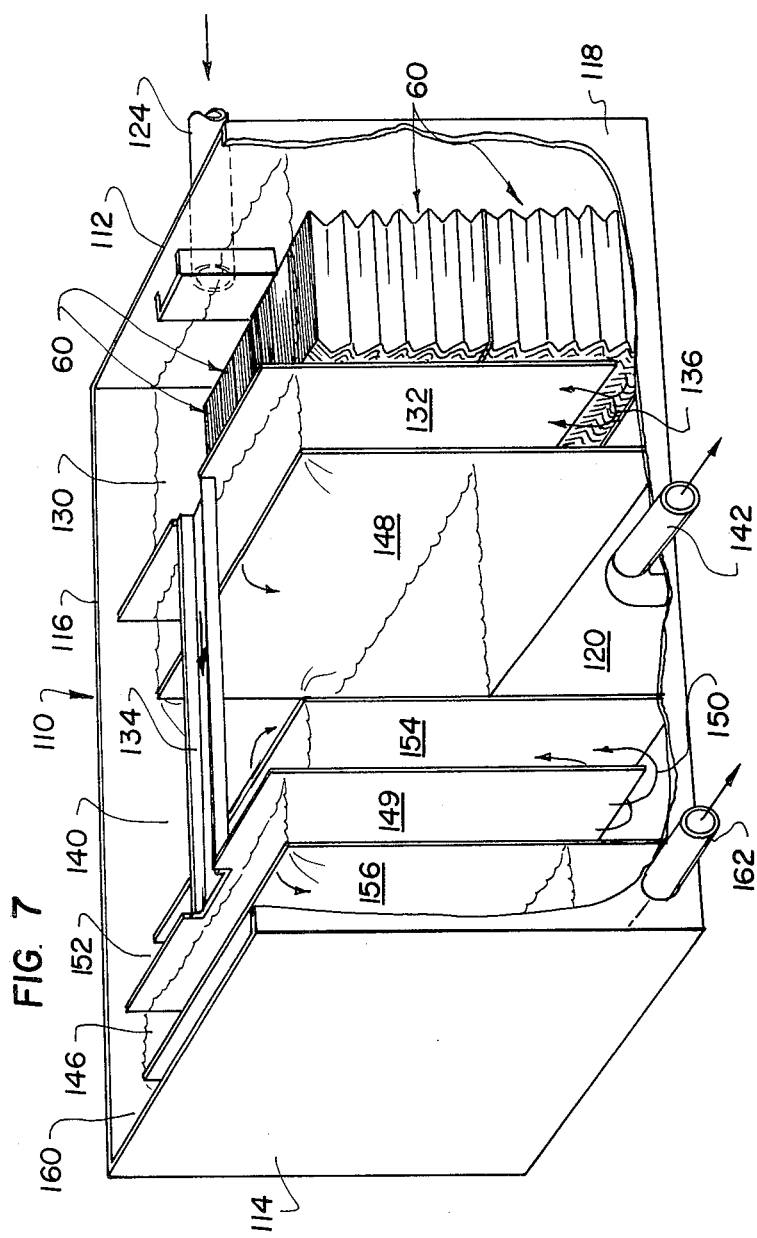
FIG. 7 is a perspective view, with portions cut away for clarity, showing the invention both in its method and construction.

Turning to the drawings in particular, the invention embodied in FIG. 1 comprises a stack of spaced apart corrugated plates generally designated 50 which plates are made of resilient material so that the stack as a whole can be distorted to change at least one of its dimensions and permit its insertion into a housing, in particular a liquid separator housing, with defined dimensions.

The stack 50 is made up of a plurality of spaced plates 10 which are connected to each other. Means for connecting the plates to each other may take the form of pegs 12, 14 and 16 which, as shown in FIG. 2, each have a projection 22 and a recess 24. Projection 22 of an underlying plate 10 is received in recess 24 of an overlying plate.

While the pegs 12, 14 and 16 are shown as being integral with the remainder of the plates 10, any suitable interlocking apparatus can be utilized which is integral or not integral with the plates for connecting the plates to each other without the use of an external frame.

The material used for constructing plates 10 are resilient, so that they can be distorted by external forces, such as the force of gravity, and, once the forces are removed, returned to their original shape. This material is exemplified by polypropylene.

Turning to FIG. 3, each stack 50 has a stack length A, a stack width B and a common plate width C. The plate width C for the stack is the same as that of each individual plate in the stack. As will be brought out in greater detail hereinafter, either or both of the stack length A and the stack width B are variable, in general reducible in size to permit easy insertion of the stack within a housing having confining walls.

As also shown in FIG. 3, the interconnection means in the form of pegs 12, 14 and 16 are positioned at the corners of the stack and also intermediate the stack length, and on either side of the stack.

As a practical matter, the stacks are formed of plates which are about 12 inches in plate width by 24 inches in non-distorted plate length. The plates may be stacked, in the dimension of stack width B, from 12 inches to 120 inches. These dimensions may be changed according to requirements. In addition, a plurality of such stacks can be used in a single separator housing, which stacks are interengaged and assembled with each other to form a single large stack.

As shown in FIG. 4, the plate stack 50 can be inserted into a housing 30 having side walls 32 and 34 and a bottom 36, by suspending the stack 50 from a shackle or hook 26 for example from one side thereof. Such suspension causes the elongation of the stack width A, in the direction of arrow 40, and the simultaneous decrease of the stack width B to a reduced stack width B'. This is a natural effect of gravity on the portion of the stack which is unengaged with the hook or shackle 26, the resiliency of the material making up the individual plates 10, and the weight of these plates.

The thus elongated and width reduced stack 50 can easily be lowered into housing 30 which has a selected width B which corresponds roughly to the stack width B. It is noted that the stack width B may be slightly larger than or smaller than the housing width B.

As shown in FIG. 5, a subsequent step in the inventive method is the release of stack 50 from its hook or shackle 26. The natural resiliency of the material making up plates 10 then cause stack 50 to resume its original dimensions, and thus expand in the direction of arrow 42. With the stack width D being equal to the housing width B, the opposite sides of stack 50 come into close engagement with the opposite walls 32 and 34 of housing 30. The problem of the prior art involving insertion of a stack is thus avoided, even with housings which cannot be moved or opened.

It is noted that the showing of FIG. 4 is exaggerated for clarity. In actuality the change in dimensions will be slight, but sufficient to permit easy entry of the stack into a selected housing which is properly dimensioned.

It is noted that the interconnections 12, 14 and 16 can be rearranged or modified as desired to permit an increase or decrease of such deformation and change in dimensions.

FIG. 6 shows another embodiment of the inventive method wherein, the stack 50 is engaged, intermediate its length, by a sling or hook 28. Such engagement again leaves much of the stack unsupported. In this case the stack sags at its opposite sides and its stack length A is thus reduced, through the action of gravity, to a dimension A'. The stack A' can be positioned into a suitably dimensioned housing thus in a similarly easy manner as with the method illustrated by FIGS. 4 and 5.

FIG. 7 shows a combination of a plurality of stacks 60, which are inserted according to the inventive method, into a housing 130 formed by walls of a liquid separator 110. The embodiment shown in FIG. 7 roughly corresponds to the invention disclosed by the former U.S. Patent to James, with the numbers chosen to correspond roughly to those numbers used in the James patent with the addition of 100.

The separator 110 comprises a substantially rectangular tank having end walls 112 and 114, side walls 116 and 118, and a bottom 120. The end wall 112 is provided with an inlet fitting for the inflow of a water and oil mix or any liquids of different densities. The mixture flows inwardly through the fitting 124 into tank 130 which forms a settling tank. The opposite end of settling tank 130 is divided by a partition wall 132 having a top overflow connected into an overflow trough 134. The bottom of settling tank 30 includes a passage 136 which connects into a small area heavy liquid collecting tank 138. The collecting tank 138, in turn, overflows into an overflow or outlet tank 140. Tank 140 includes an outlet fitting 142 for the delivery of the heavier liquid out of the device, which is usually water.

The settling tank 130 is designed to hold the liquid therein for a time period sufficient to permit some separation of the heavier density liquid from the lighter density liquid, which lighter density liquid collects at the surface and moves along a trough 134 and into a final stage lighter liquid separation tank 146.

The heavier liquid of a settling tank 130 flows under the partition 132 through passage 136 and into heavier liquid collecting tank 138. No lighter liquid will flow through this path. The heavier liquid, such as water, which is now free of oil will pass through the heavier liquid collecting tank 138 and over the top of a partition 148 which is arranged at the opposite end of this tank and into outlet tank 140. The heavier liquid or water which follows this path will move out through outlet 142 of tank 140. Final stage lighter liquid separating tank 146 is divided at one end by a baffle or partition 149 having an opening or passage 150 at its lower end for the passage of any heavier liquids such as water which may remain at this stage. This heavier liquid will move through passage 150 and into a second heavy liquid collecting tank 152 which is separated from the outlet tank 140 by a partition 154. The partition 154 permits overflow of the lighter liquid from the heavier liquid collecting tank 152 into the outlet tank 140. While liquid passing over trough 134 is predominantly of lighter density, for example oil, it may contain some water which is separated over passage 150. The oil or lighter liquid however will spill over a partition wall 156 which is defined between the final stage liquid separating tank 146 and a final lighter liquid collecting tank 160. This separated light liquid 160 may be removed through a connecting conduit 162.

Since the spacing between side walls 116 and 118 are fixed and cannot easily be moved, it is important to be able to assemble the plurality of stacks 60 into tank 130. The stacks should fully fill the width of this tank to prevent any movement of liquid around the stack, rather than through the stack.

It has been found that the separator of FIG. 7, without the stack of plates 60, can remove sufficient oil from water to reduce the oil concentration to about 75 parts per million (ppm). With the stacks of plates 60 in place however it has been found that this figure can be reduced to 5 to 10 ppm. This effect evidences the usefulness and importance of providing separators without such plates, with plates, where possible. The invention is instrumental in this regard, in that it uses substantially frame free stacks of plates which may be distorted to permit their easy entry into such confined spaces.

While specific embodiments of the invention have been shown and described in detail to illustrate the application of the principles of the invention, it will be understood that the invention may be embodied otherwise without departing from such principles.

What is claimed is:

1. A method of inserting a stack of interconnected corrugated plates defining tortuous paths of a liquid separator therebetween and made of resilient material, the stack having a stack length and a stack width, in a housing having side walls separated from each other by substantially one of the stack length and stack widths, comprising:

engaging the stack at a portion thereof so as to leave a remainder of the stack unengaged;

suspending the stack from said portion so that the plates of the stack become distorted to change one of the stack widths and stack lenghts;

inserting the stack with distorted plates into the housing with the changed one of the stack length and stack width extending between the housing side walls; and releasing the stack after it is in the housing so that the distorted plates, by the action of their resilient material, return the stack to one of its stack lengths and stack widths and so that the stack extends fully across the housing between its side walls.

2. A method according to claim 1, wherein the stack is engaged from one side thereof and suspended with the stack length extending vertically so that the stack width is reduced and the stack length is increased.

3. A method according to claim 1, wherein the stack is engaged at an intermediate location along the stack length so that the stack length is reduced.

4. A method according to claim 1, including providing interconnection means on each of the plates which engage interconnection means of adjacent plates in the stack.

* * * * *